(12) United States Patent
Wali

(10) Patent No.: US 11,763,512 B2
(45) Date of Patent: Sep. 19, 2023

(54) METHOD, USER DEVICE AND A PRINTING DEVICE FOR MANUFACTURING ONE OR MORE CUSTOMIZED PRODUCTS

(71) Applicant: Moutie Wali, Coquitlam (CA)

(72) Inventor: Moutie Wali, Coquitlam (CA)

( * ) Notice: Subject to any disclaimer, the term of this patent is extended or adjusted under 35 U.S.C. 154(b) by 296 days.

(21) Appl. No.: 17/165,190

(22) Filed: Feb. 2, 2021

(65) Prior Publication Data

US 2021/0158596 A1 May 27, 2021

(51) Int. Cl.
| | |
|---|---|
| *G06T 15/00* | (2011.01) |
| *B29C 64/386* | (2017.01) |
| *G06K 15/00* | (2006.01) |
| *H04N 1/00* | (2006.01) |
| *B29C 64/10* | (2017.01) |
| *G06V 40/16* | (2022.01) |

(52) U.S. Cl.
CPC ............. *G06T 15/00* (2013.01); *B29C 64/10* (2017.08); *B29C 64/386* (2017.08); *G06K 15/005* (2013.01); *G06V 40/16* (2022.01); *H04N 1/00129* (2013.01)

(58) Field of Classification Search
None
See application file for complete search history.

(56) References Cited

U.S. PATENT DOCUMENTS

| | | | | |
|---|---|---|---|---|
| 9,873,229 | B2 * | 1/2018 | Chun | B29C 64/393 |
| 2021/0173592 | A1 * | 6/2021 | Pettis | G06F 3/1229 |
| 2021/0196217 | A1 * | 7/2021 | Hu | A61B 6/463 |
| 2022/0110413 | A1 * | 4/2022 | Che | B33Y 10/00 |

* cited by examiner

*Primary Examiner* — Dov Popovici
(74) *Attorney, Agent, or Firm* — Lambert Shortell & Connaughton; David J. Connaughton, Jr.; Justin P. Tinger

(57) ABSTRACT

A method, user device, and a printing device for manufacturing one or more customized products are provided. The method involves capturing one or more three-dimensional (3-D) images of one or more objects, transmitting the captured one or more 3D images to a printing device, converting the transmitted one or more 3D images into a predefined format; wherein the predefined format is a format read by the printing device. The method further comprises printing the converted one or more 3D images using the printing device to create one or more 3D objects, wherein the one or more 3D objects are a replica of the one or more objects in the one or more captured 3D images, and manufacturing one or more customized products using the created one or more 3D objects.

18 Claims, 5 Drawing Sheets

METHOD, USER DEVICE AND A PRINTING DEVICE FOR MANUFACTURING ONE OR MORE CUSTOMIZED PRODUCTS

TECHNICAL FIELD

The present disclosure relates to manufacturing one or more customized products. In particular, the present disclosure relates to manufacturing one or more customized products using facial recognition technology in combination with 3D printing techniques.

BACKGROUND

Facial recognition technology on smartphones has been around for many years now. The technology allows getting an accurate depiction of one's face using a digital scanner. There are different variations of the technology used by different phone manufacturers, but one popular implementation includes using a projector that transmits tens of thousands of invisible dots on one's face to collect information on facial features including depth. This method allows for the creation of a 3D digital image of someone's face. It is then possible to compare an original digital image created at setup with a new image every time a person tries to unlock the phone. If they are a match; the phone is unlocked, otherwise, the authentication fails. Facial recognition technology for smartphones is highlighted in the FIG. 1.

The use of face recognition technology has been popularised by their introduction into the iPhone lineups in 2017 and has grown in popularity ever since. Many other phone manufacturers have adopted them, including Samsung, Google, and Motorola. Face recognition enabled devices are expected to reach almost 10 billion by the end of 2025.

Mass production brings cost-effective and accessible products to all consumers worldwide, but still uses simplified sizing and fitting systems. Customers who do not fit the standard mold are left with products that don't properly suit them. There is a growing demand for customization as products get more elaborate and as customer needs evolve. From apparel to medical accessories and sports goods product customization will play an increasing role in the manufacturing industry. The below-mentioned invention is meant to provide a revolutionary method, user device, and printing device for manufacturing customized products on a large scale.

Existing techniques known in the art comprises either the user physically traveling to the manufacturing facility to provide the shape, size, dimensions, and scale to get a customized wearable product and/or measuring the shape, size, dimensions, and scale by the user himself or have it done by a specialised fitter and then sending the measured shape, size, dimensions, and scale to the manufacturer. However, there are high chances that the measurements taken are not enough or are not accurate in both cases. The inaccuracy of the measurements may lead to a product that would not be an exact fit for the user. Further, in addition to desiring for exact shape, sizes, and dimensions, the user may also desire to see the physical appearance of the wearable product.

Thus, there is a need in the art to provide one or more techniques for manufacturing one or more customized products at a lower cost.

SUMMARY

In one non-limiting embodiment, a method for manufacturing one or more customized product is provided. The method comprises capturing one or more three dimensional (3-D) images of one or more objects and transmitting the captured one or more 3D images to a printing device. The method further comprises converting the transmitted one or more 3D images into a predefined format, wherein the predefined format is a format read by the printing device. The method further comprises printing the converted one or more 3D images using the printing device to create one or more 3D objects, wherein the one or more 3D objects are a replica of the one or more objects in the one or more captured 3D images and manufacturing one or more customized products using the created one or more 3D images.

In one non-limiting embodiment, a user device used in manufacturing one or more customized products is provided. The user device comprises a three-dimensional (3D) image capturing unit configured to capture one or more three dimensional (3-D) images of one or more objects. The user device further comprises a transceiver unit configured to transmit the captured one or more 3D images to a printing device, wherein the transmitted one or more 3D images are converted into a predefined format; wherein the predefined format is a format read by the printing device, wherein the converted one or more 3D images are printed using the printing device to create a one or more 3D objects, wherein the one or more 3D objects are a replica of the one or more objects in the one or more captured 3D images, and wherein the 3D objects are used to manufacture one or more customized products using the created one or more 3D images.

In one non-limiting embodiment, a printing device used in manufacturing one or more customized products is provided. The printing device comprises a transceiver unit configured to receive one or more captured three-dimensional (3D) images of one or more objects, wherein the one or more captured 3D images are received from a user device; and wherein the one or more captured 3D images are captured by an image capturing unit. The printing device further comprises a format conversion unit configured to convert the received one or more 3D images into a predefined format, wherein the predefined format is a format read by the printing device, a printing unit configured to print the one or more converted 3D images to create a one or more 3D objects, wherein the one or more 3D objects are a replica of the one or more objects in the one or more captured 3D images, and wherein the 3D objects are used to manufacture one or more customized products using the created one or more 3D images

DETAILED DESCRIPTION

Figure 1:
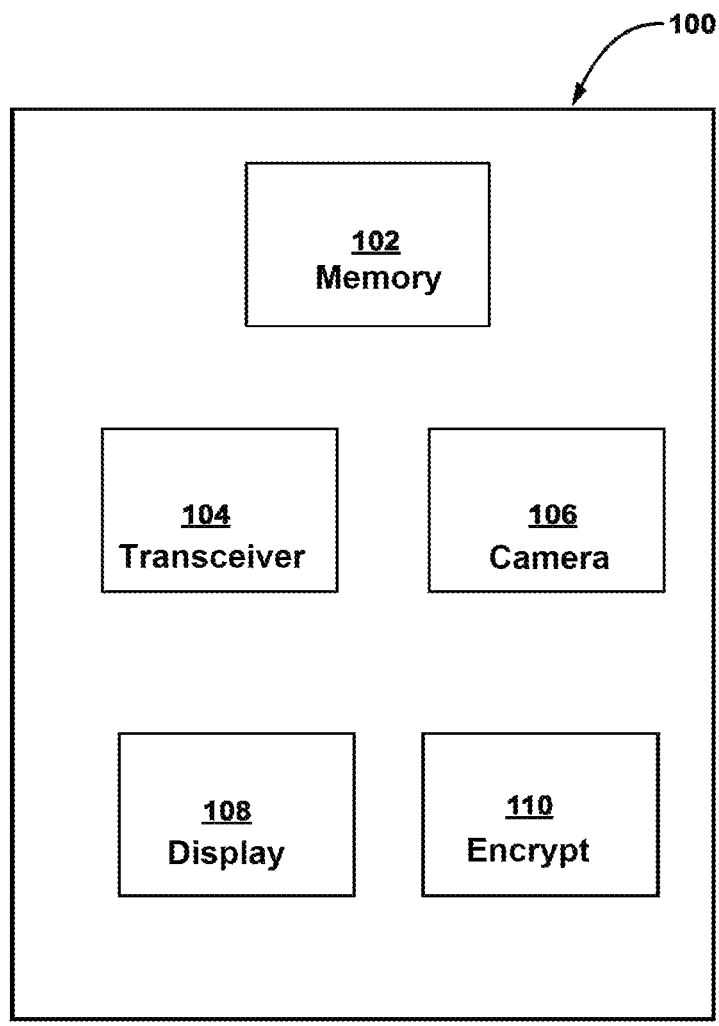
FIG. 1 is a block diagram of a user device, according to an example embodiment.

Exemplary embodiments now will be described regarding the accompanying drawings. The invention may, however, be embodied in many different forms and should not be construed as limited to the embodiments set forth herein;

rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

The figures depict a simplified structure only showing some elements and functional entities, all being logical units whose implementation may differ from what is shown. The connections shown are logical; the actual physical connections may be different.

Presented herein is a method, a user device, and a printing device for manufacturing one or more customized product Referring to FIG. 1, a block diagram of a user device 100 is shown. The user device 100 comprises a memory 102, a transceiver unit 104, a three-dimensional (3D) image capturing unit 106, and a display unit 108. The user device 100 may additionally include an encryption unit 110.

The user device 100 may include, for example, a smartphone, a tablet, a laptop with image capturing techniques, a computing device with image capturing techniques. In one embodiment, the user device 100 may be a touch-based user device for receiving user commands. In another embodiment, the device 100 may have one or more keypads for receiving user commands.

The transceiver unit 104 may include one or more antennas for transmitting and/or receiving one or more content. In one embodiment, the transceiver unit 104 may be omitted, and a separate transmitting means and/or receiving means may be used to send or receive one or more content.

The display unit 108 may be configured to display one or more images. The display unit 108 may be a Liquid crystal display (LCD) type display in one embodiment. The display unit 108 may be a Light Emitting Diode (LED) type display in another embodiment.

In one embodiment, the user device 100 may additionally include one or more means for receiving user commands. For example, the user commands may include one or more commands for capturing the 3D images. As explained above, the user commands may be received using touch commands in a touch-based display or maybe receiving using a keypad based display Once the user commands are received, the 3D image capturing unit gets activated.

The 3D image capturing unit 106 is configured to capture one or more 3D images of one or more objects. The one or more objects may be living beings or non-living things. Although one or more objects have been considered living beings for the sake of explanation, the one or more objects should not be considered limiting to living beings only.

In one embodiment, the 3D image capturing unit 106 is configured to capture 3D images of the user's body part. The body parts may include legs, feet, face, hands. However, the body parts are not limited to the one mentioned here. In one embodiment, the 3D image capturing unit 106 is a dot projector present on the user device. As known in the art, the dot projector may be used in user devices for facial recognition techniques which are then used to unlock the user device. The process followed is as follows: A 3D image of the user may be obtained using the dot projector and may be compared to a pre-stored 3D image of the user to authenticate the user. Once the authentication is successful, the user device gets unlocked.

The same techniques used to capture a 3D image of the user's face may be used to capture one or more objects by the dot projector. An example of capturing one or more 3D images of the user's face by the dot projector is shown in FIG. 2.

Figure 2:
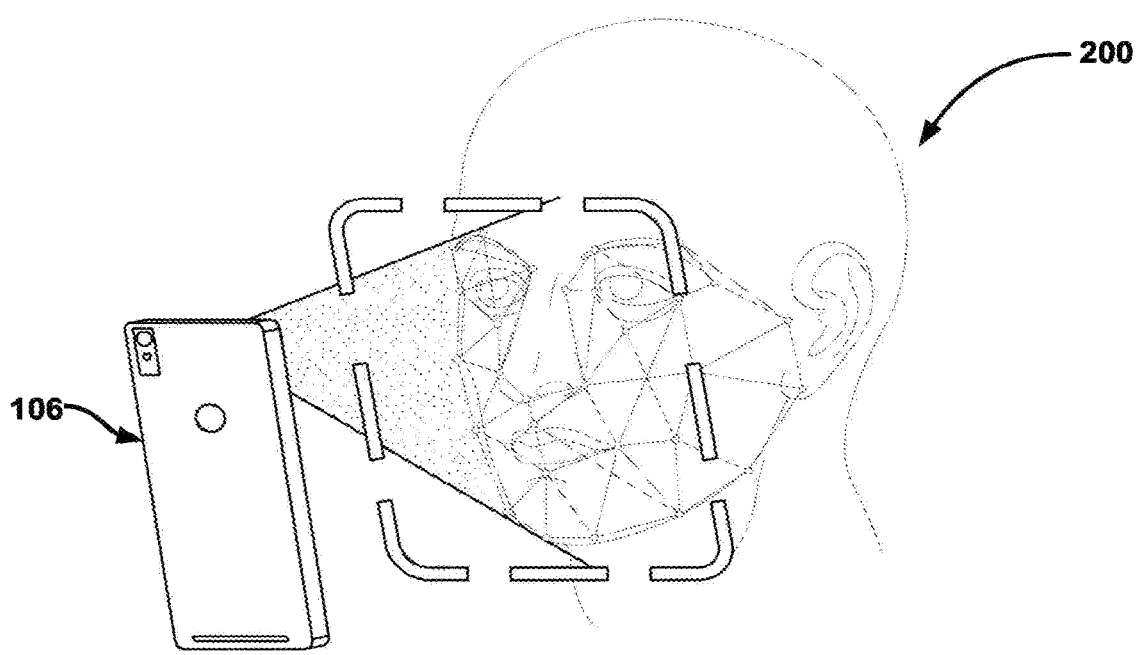
FIG. 2 depicts an example of capturing one or more 3D images using an image capturing unit, according to an example embodiment.

Referring to FIG. 2, an example technique to capture the one or more 3D images of a user's face by the 3D image capturing unit 106 is shown. FIG. 2 has been explained by considering a 3D image capturing unit 106 as a dot projector. FIG. 2 shows that the 3D image capturing unit 106 may project a grid of small infrared dots onto the user's face. The infrared dots may be projected using the one or more infrared sensors present in the user device 100. The image capturing unit may then emit light on the face. The light may be emitted using the light-emitting diodes present in the user device 100. The light thus emitted may be distributed on the whole face area such that the whole of the face gets illuminated.

The infrared sensor may then capture an infrared picture of the user and generates a 3D facial map. The facial map may be formed by one or more infrared dots and may depict the face of the user from various angles. This may help to capture the overall image of the face of the user. Using these techniques, the 3D image capturing unit 106 generates the 3D image of the face. Although only the face of the user has been shown in FIG. 2, any body part can be used to create 3D images using the 3D image capturing unit 106.

Figure 3:
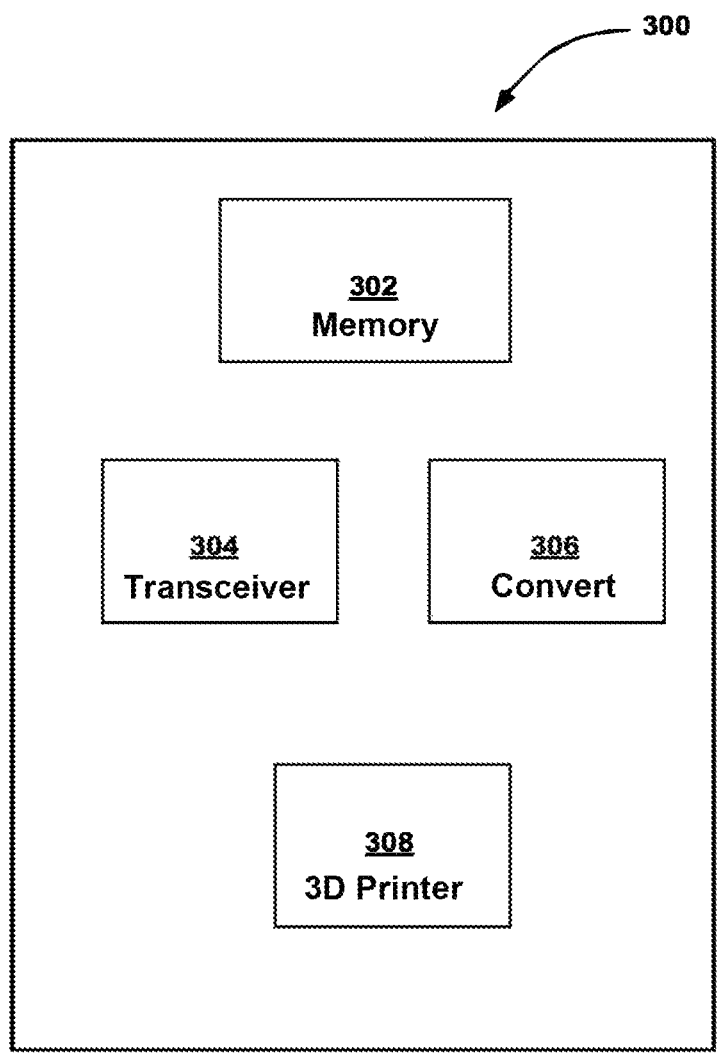
FIG. 3 is a block diagram of a printing device, according to an example embodiment.

Referring back to FIG. 1, the transceiver unit 104 is configured to transmit the one or more 3D images captured by the 3D image capturing unit 106 to a printing device 300 (as explained in FIG. 3).

One or more 3D images may be transmitted over the network. The network may comprise wireless or wired networks. In one embodiment, the wireless network may include WLAN.

In one embodiment, the captured one or more 3D images may be encrypted by the encryption unit 110 before transmitting to the printing device 300. The encryption unit 110 may perform encryption on one or more 3D images in a manner such that the encrypted images may be decrypted only using a unique key. The encryption of the 3D images enhances the security of the 3D images such that any fraudulent user may not misuse them.

Referring to FIG. 3 now, a block diagram of the printing device 300 is shown. The printing device 300 includes a memory 302, a transceiver unit 304, a format conversion unit 306, and a printing unit 308. In one embodiment, the printing device 300 may be a 3D printer that is used to create three dimensional (3D) objects.

The one or more 3D images transmitted from the user device 100 over the network are received by the transceiver unit 304. The transceiver unit 304 may be similar to the transceiver unit 104 and may be used to transmit/receive the data.

The 3D images received from the user device 100 may not be in a format that can be read by the printing device 300. Hence, to enable the printing device 300 to read the received one or more 3D images, the one or more received 3D images are fed into the format conversion unit 306.

The format conversion unit 306 may convert the received 3D images into a predefined format that can be read by the printing device 300. The predefined format may be stored in the memory 302 of the printing device 300 by the manufacturer of the printing device 300. For example, the 3D image received from the user device 100 may be in a ".OBJ" format, whereas the predefined format which can be read by the printing device 300 may be in ".3DS" format. Hence, the format conversion unit 308 may convert the ".OBJ" format into the ".3DS" format. Please note that the ".OBJ" and ".3DS" formats are used merely as examples, and any such format can be used.

The main role of the printing device 300 is to create 3D objects. Hence, once the received one or more 3D images are converted into the predefined format which can be read by the printing device 300, the printing unit 308 is configured to use the converted 3D images to print one or more 3D objects. This is done in one or more techniques used to print the one or more 3D objects by a 3D printer known in the art.

One or more 3D objects are physical objects having a particular shape and size. The particular shape, size, dimensions, and scale of the 3D objects may correspond to the shape, size, dimensions, and scale of the user's original body part. Further, the one or more 3D objects, thus printed, are replicas of the one or more objects captured in the one or more received 3D images. For example, referring to FIG. 2 again, the 3D image of the face of the user is captured by the 3D image capturing unit 106. Thus, the 3D object, in this case, would be the 3D face of the user. Similarly, if an object is the user's leg, the 3D object would be the 3D leg of the user.

In one embodiment, the replication of the 3D objects would mean that the 3D objects will have the same size, shape, exact dimensions, and scale as that of the object captured in the one or more 3D images. Thus, in the case of the leg of the user as the object captured in the 3D image, the 3D object would be a physical leg printed with the exact shape, size, and dimensions as that of the original leg of the user.

Once the 3D objects are created, information such as the shape, size, and dimensions of the object captured in the 3D image may be extracted. The information may be extracted using one or more image processing techniques known in the art. This information may be used to manufacture customized products for the user. The customized product may be a wearable product made according to the requirements of the user.

A manufacturer of the product may receive the extracted information from one or more 3D objects, and the extracted information may be used to manufacture one or more products that are an exact fit for the user. For example, the manufacturer may prepare customized products such as shoes, gloves, rings, bangles, etc., exactly tailored for the user. In one embodiment, the customized products mentioned here are merely examples and may not be limited to the one mentioned here. In one embodiment, the customized product may be manufactured manually by the manufacturer. For example, customized shoes for the user may be manufactured by a cobbler manually. In another embodiment, the customized product may be manufactured by the machines available at the manufacturer's facility.

Figure 4:
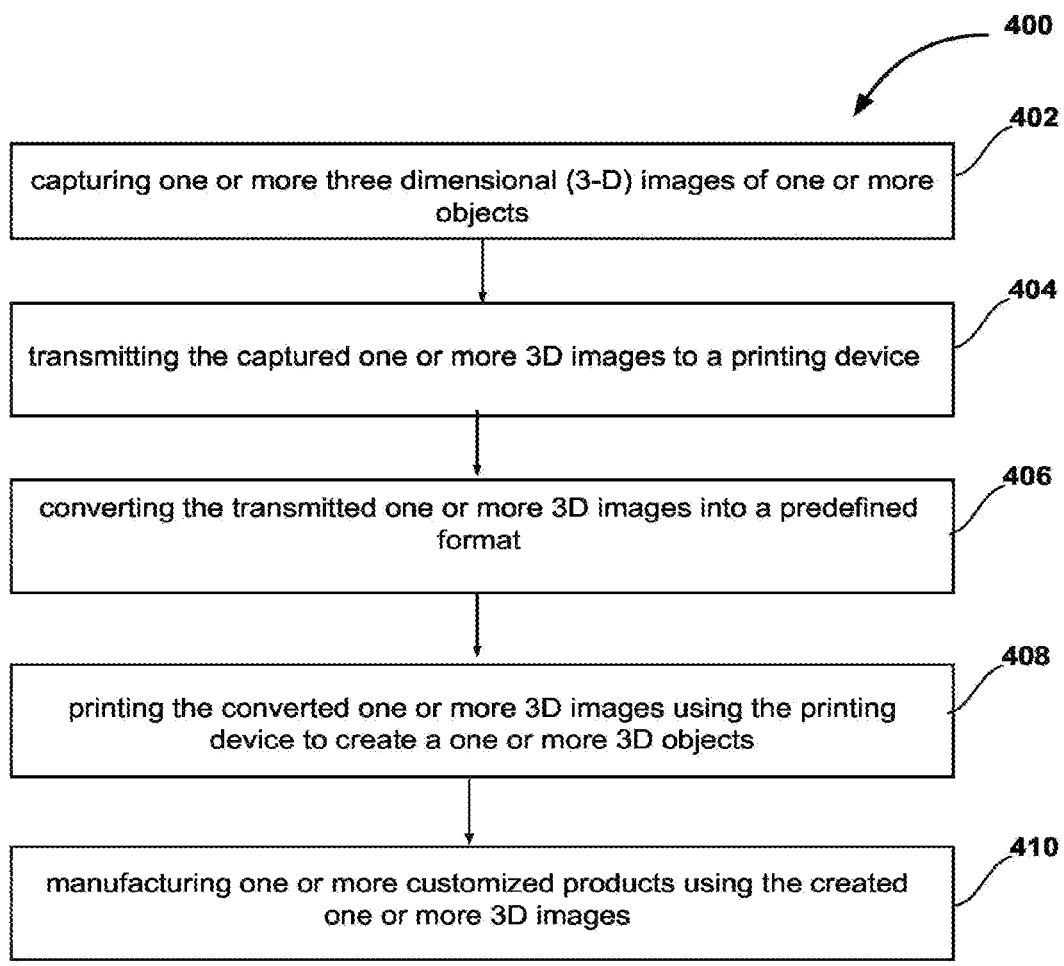
FIG. 4 is a method for manufacturing one or more customized products, according to an example embodiment.

Referring to FIG. 4, a method 400 for manufacturing a customized product is explained. At step 402, the method comprises capturing, by one or more 3D image capturing unit, one or more three dimensional (3-D) images of one or more objects. At step 404, the method comprises transmitting, by one or more transceivers, the captured one or more 3D images to a printing device 300. At step 406, the method comprises converting the transmitted one or more 3D images into a predefined format. The predefined format is a format that can be read by the printing device 300. At step 408, the method comprises printing the converted one or more 3D images using the printing device 300 to create one or more 3D objects. The one or more 3D objects; thus, created by the printing device 300 are a replica of the one or more objects present in the one or more captured 3D images. Further, at step 410, the method comprises manufacturing one or more customized products using the created one or more 3D images.

Figure 5:
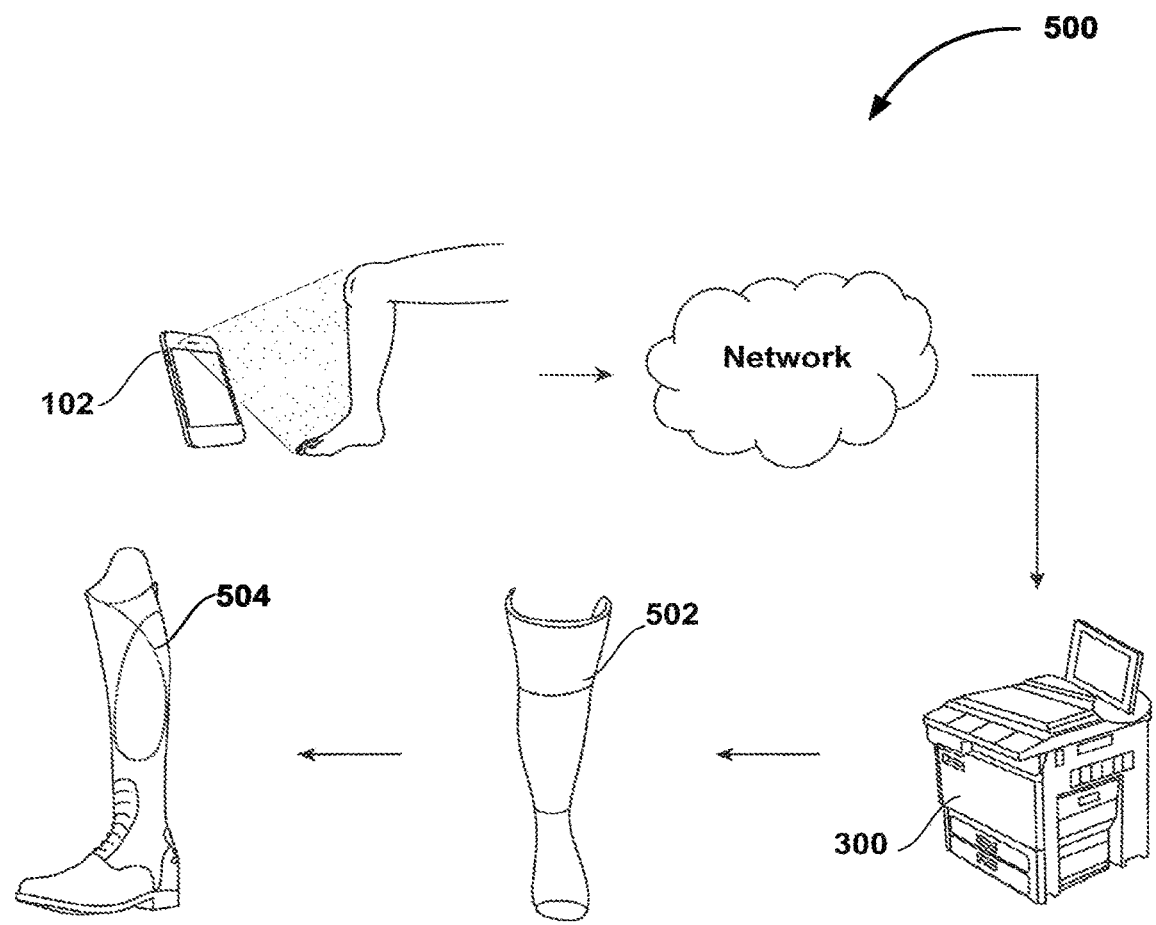
FIG. 5 is an illustrative exemplary embodiment, according to an example embodiment.

Referring to FIG. 5, the present disclosure is explained with an example 500. Example 500 has been explained, keeping in view the user's requirements for creating a customized boot for the user's leg.

Initially, a 3D image of the leg of the user may be captured by one or more dot projector present on a smartphone 102 available to the user. The 3D image, thus captured may include the image of the user's leg and may include the exact shape, dimensions, and size of the user's leg. The captured 3D images of the leg may be transmitted to a 3D printer using a wired or wireless network. The captured 3D images of the leg may be converted into a predefined format which can be read by the 3D printer 300. The 3D printer then prints the converted 3D image in the form of 3D objects 502. The 3D object, in this case, may be a physical/tangible object and would be a replica of the captured 3D image of the leg of the user. The 3D leg, thus printed, would have the exact shape, size, and dimensions that of the original leg of the user.

This 3D object thus printed would help a manufacturer to manufacture customized boot 504 for the user. As the manufactured product has the exact shape, size, and dimensions of the leg of the user, it would be very easy for the manufacturer to manufacture boots that would be an exact fit for the user.

In one embodiment, the present disclosure is equally applicable for manufacturing one or more customized products for any living being other than a human being. For example, the present disclosure may be used to manufacture one or more customized products for an animal. More particularly, for example, the present disclosure may be used to manufacture a customized saddle for a horse.

In one embodiment, the present disclosure may be not be limited to living beings and may be used to manufacture customized products for non-living things. For example, the present disclosure may be used to create a custom cover for an antique chair.

In one embodiment, the function of various units as described in the present disclosure may be performed by one or more processors present in the user device 100 and/or the printing device 300, and the various units may be omitted.

The memory 102 and 302 are shown in FIGS. 1 and 3 may include Read-Only Memory (ROM), Random Access Memory (RAM), magnetic disk storage media devices, optical storage media devices, flash memory devices, electrical, optical, or other physical/tangible memory storage devices. Thus, in general, the memory may comprise one or more tangible (non-transitory) computer-readable storage media (e.g., a memory device) encoded with software comprising computer-executable instructions, and when the software is executed, it is operable to perform the operations described herein.

The flowchart and schematic diagrams illustrate the architecture, functionality, and operations of some embodiments of methods, systems, and computer program products for managing security associations over a communication network. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may be executed substantially concurrently, or the blocks may sometimes be executed in the reverse order, depending on the functionality involved.

In the drawings and specification, there have been disclosed exemplary embodiments of the invention. Although specific terms are employed, they are used in a generic and descriptive sense only and not for purposes of limitation.

What is claimed is:

1. A method for manufacturing one or more customized products, the method comprising:
   capturing one or more 3D images of one or more objects using a digital camera;
   storing the one or more 3D images on a memory of a computer;
   transmitting the captured one or more 3D images to a 3D printer from the memory of the computer;
   converting, by a processor of the 3D printer, the transmitted one or more 3D images into a predefined format; wherein the predefined format is a format read by the 3D printer;
   printing the converted one or more 3D images using the 3D printer to create one or more 3D objects, wherein the one or more 3D objects are a replica of the one or more objects in the one or more captured 3D images; and
   manufacturing one or more customized products using the captured one or more 3D images.

2. The method as claimed in claim 1, wherein the one or more 3D images of one or more objects are captured by one or more image capturing sensors present in a user device.

3. The method as claimed in claim 2, wherein the one or more image capturing sensors comprises dot projector.

4. The method as claimed in claim 1, wherein the one or more objects captured in the one or more 3D images are body parts of a living being.

5. The method as claimed in claim 1, further comprising:
   extracting one or more information from the one or more 3D objects, wherein the one or more information associated with shape, size, dimension, and scale of the one or more objects captured in the one or more 3D images;
   wherein manufacturing the customized products based on the extracted one or more information.

6. The method as claimed in claim 1, wherein the one or more customized products are one or more wearable objects that are worn by a living being.

7. A user device used in manufacturing of one or more customized products, the user device comprising:
   a 3D image capturing camera configured to capture one or more 3D images of one or more objects;
   a memory operable to store the captured one or more 3D images;
   a transceiver configured to transmit the captured one or more 3D images to a 3D printer;
   wherein the transmitted one or more 3D images are converted into a predefined format by a processor of the 3D printer based on programming stored in a memory of the 3D printer; wherein the predefined format is a format read by the 3D printer;
   wherein the converted one or more 3D images are printed using the 3D printer to create one or more 3D objects, wherein the one or more 3D objects are a replica of the one or more objects in the one or more captured 3D images; and
   wherein the 3D objects are used to manufacture one or more customized products using the captured one or more 3D images.

8. The user device as claimed in claim 7, the user device wherein the one or more 3D images of one or more objects are captured by one or more image capturing sensors present in the user device.

9. The user device as claimed in claim 8, the user device, wherein the one or more image capturing sensors comprises dot projector.

10. The user device as claimed in claim 7, wherein the one or more objects captured in the one or more 3D images are body parts of a living being.

11. The user device as claimed in claim 7, further comprising:
    extracting one or more information from the one or more 3D objects, wherein the one or more information associated with shape, size, dimension, and scale of the one or more objects captured in the one or more 3D images;
    wherein manufacturing the customized products based on the extracted one or more information.

12. The user device as claimed in claim 7, wherein the one or more customized products are one or more wearable objects that are worn by a living being.

13. A printing device used in manufacturing of one or more customized products, the printing device comprising:
    a transceiver configured to receive one or more captured 3D images of one or more objects, wherein the one or more captured 3D images are received from a user device;
    a processor configured to convert the received one or more 3D images into a predefined format; wherein the predefined format is a format read by the printing device;
    a 3D printer configured to print the one or more converted 3D images to create one or more 3D objects, wherein the one or more 3D objects are a replica of the one or more objects in the one or more captured 3D images; and wherein the 3D objects are used to manufacture one or more customized products using the captured one or more 3D images.

14. The printing device as claimed in claim 13, wherein the one or more captured 3D images of one or more objects are captured by one or more image capturing sensors present in the user device.

15. The printing device as claimed in claim 14, wherein the one or more image capturing sensors comprises dot projector.

16. The printing device as claimed in claim 13, wherein the one or more objects captured in one or more 3D images are body parts of a living being.

17. The printing device as claimed in claim 13, further comprising:
   extracting one or more information from the one or more 3D objects, wherein the one or more information associated with shape, size, dimension, and scale of the one or more objects captured in the one or more 3D images;
   wherein manufacturing the customized products based on the extracted one or more information.

18. The printing device as claimed in claim 13, wherein the one or more customized products are one or more wearable objects that are worn by a living being.

* * * * *